United States Patent
Schlaffke et al.

[11] Patent Number: 5,593,200
[45] Date of Patent: Jan. 14, 1997

[54] REAR SEAT BENCH FOR AN ESTATE CAR

[75] Inventors: Hans-Juergen Schlaffke, Saulgau; Armin Kienzle, Rottenburg, both of Germany

[73] Assignee: Mercedes-Benz AG, Stuttgart, Germany

[21] Appl. No.: 602,947

[22] Filed: Feb. 16, 1996

[30]     Foreign Application Priority Data

Feb. 16, 1995   [DE]   Germany .................. 195 05 160.2

[51] Int. Cl.$^6$ ............................................. B60R 5/04
[52] U.S. Cl. ............................. 296/37.16; 296/65.1
[58] Field of Search ............................ 296/37.16, 189, 296/63, 64, 65.1, 68.1; 297/216.13

[56]            References Cited

U.S. PATENT DOCUMENTS

| | | | |
|---|---|---|---|
| 4,202,577 | 5/1980 | Breitschwerdt et al. | 296/37.16 X |
| 5,011,208 | 4/1991 | Lewallen | 296/37.16 |
| 5,039,155 | 8/1991 | Suman et al. | 296/65.1 |
| 5,273,336 | 12/1983 | Schubring et al. | 296/65.1 |
| 5,533,775 | 7/1996 | Cyliax | 296/65.1 X |

FOREIGN PATENT DOCUMENTS

| | | | |
|---|---|---|---|
| 258823 | 3/1988 | European Pat. Off. | 296/37.16 |
| 9212370 U | 1/1993 | Germany . | |

*Primary Examiner*—Joseph D. Pape
*Attorney, Agent, or Firm*—Evenson, McKeown, Edwards & Lenahan, P.L.L.C.

[57]            ABSTRACT

Backrests of a rear seat bench for an estate car which are asymmetrically divided in two can experience pronounced bending in the travel direction in the larger backrest part in the event of frontal impact. This bending can endanger the safety of people sitting on the rear seat bench. To prevent this, one energy absorber is arranged in the region of the at least two closure arrangements, between the frame of the larger backrest part and the housing profile.

5 Claims, 2 Drawing Sheets

REAR SEAT BENCH FOR AN ESTATE CAR

BACKGROUND AND SUMMARY OF THE INVENTION

The present invention relates to a rear seat bench for an estate car in which a backrest is divided in two in an uneven ratio, it being possible for each backrest part to be folded down separately, and each backrest part exhibits a backrest frame and is secured to the bodywork on its outer side facing the respective rear side door. At least two horizontally spaced-apart closure arrangements are arranged on the frame of the larger backrest part for the purpose of releasably fastening a rolling-boot-shutter housing profile which extends over the entire width of the backrest.

Such a rear seat bench is known from the T-model Mercedes. The backrest of the rear seat bench is divided in a ratio of two thirds to one third. Provided on the wider backrest part, facing the boot, are two bayonet closures onto which a housing profile of a rolling boot shutter can be pushed in order to be secured thereon. The housing profile and the rolling boot shutter extend over the entire width of the backrest, and thus along both the larger and smaller backrest parts. The two parts of the backrest are secured to the bodywork, on their side facing the respective rear side door, by way of a lock in each case. The adjoining sides of the two backrest parts are not connected to one another. The two backrest parts may each separately be folded down forwards in order to increase the boot area.

DE 92 12 370 U1 describes a rear-seat arrangement with divided backrests which integrates in the frame of said arrangement a horizontal and vertical locking system which comprises displaceably arranged bolts to connect the upright backrests to receiving bushes which are anchored to the bodywork, and, if appropriate, connect the backrests to one another. However, high-outlay closure mechanisms with energy accumulators are required for this purpose.

An object of the present invention is to provide a rear seat bench having a backrest which does not pose any danger to the people sitting on the rear seat bench even in the event of the estate car being subjected to high impact loading.

This object has been achieved in that in each case one energy absorber is arranged in the region of the at least two closure arrangements and between the frame of the larger backrest part and the housing profile. As a result, the energy released to the larger backrest part in the event of impact loading is dissipated.

In particular in the event of frontal impact of the estate car, the larger part of the backrest, which is secured to the bodywork merely on its side facing the side rear door, is subjected to bending in the direction of travel. This bending is increased further by a belt retractor integrated in the larger backrest part, in the region of its side facing the other backrest part. In the event of frontal impact, this bending endangers the safety of people sitting on the rear seat bench. The recognition of these causes has resulted in the solution according to the invention of arranging an energy absorber between the frame of the larger backrest part and the housing profile.

The present invention makes use of the further finding that the housing profile of a rolling boot shutter of a known estate car, on one hand, is fastened merely on the rear side of the larger backrest part and, on the other hand, extends over the entire width of the backrest of the rear seat bench, i.e. over the width of the two backrest parts, and may thus be regarded as an essentially flexurally rigid bar.

For an effective reduction in the energy released, it has been found sufficient to provide an energy absorber merely in the region of the closure arrangement which is adjacent to the smaller backrest part. Improved energy reduction is, however, achieved in that in each case one energy absorber is provided in the region of each closure arrangement and between the backrest frame and the housing profile.

In one embodiment of the present invention, a steel plate folded in a number of layers is provided as the energy absorber. Use of a steel plate as the energy absorber is advantageous because it is a cost-effective material which can be worked in a relatively simple manner. The basis for the use of an energy-absorbing steel plate is that a sufficient deformation distance within which the released energy can be dissipated is provided between the point of connection to the housing profile and the corresponding other point of connection to the backrest frame. The deformation distance can be achieved by the steel plate being folded in a number of layers.

In a further embodiment of the invention, a single-layer punched part provided with a plurality of sub-regions adjoining one another in one plane acts as the energy absorber. The sub-regions of the punched part adjoin one another such that they spread apart in an accordion-like manner in the event of being subjected to loading transversely with respect to the sub-region plane. The use of a steel plate is also particularly advantageous in this embodiment. In the same manner, however, other materials with a corresponding deformation strength may also be used.

In yet a further embodiment of the invention, the punched part is fastened on the housing profile and a closure element of the closure arrangement is retained on the punched part. Consequently, the energy absorber is fastened on the housing profile and exerts its energy-dissipating action on the larger backrest part only if the rolling boot shutter is fastened on the larger backrest part, i.e. on the backrest of the rear seat bench.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
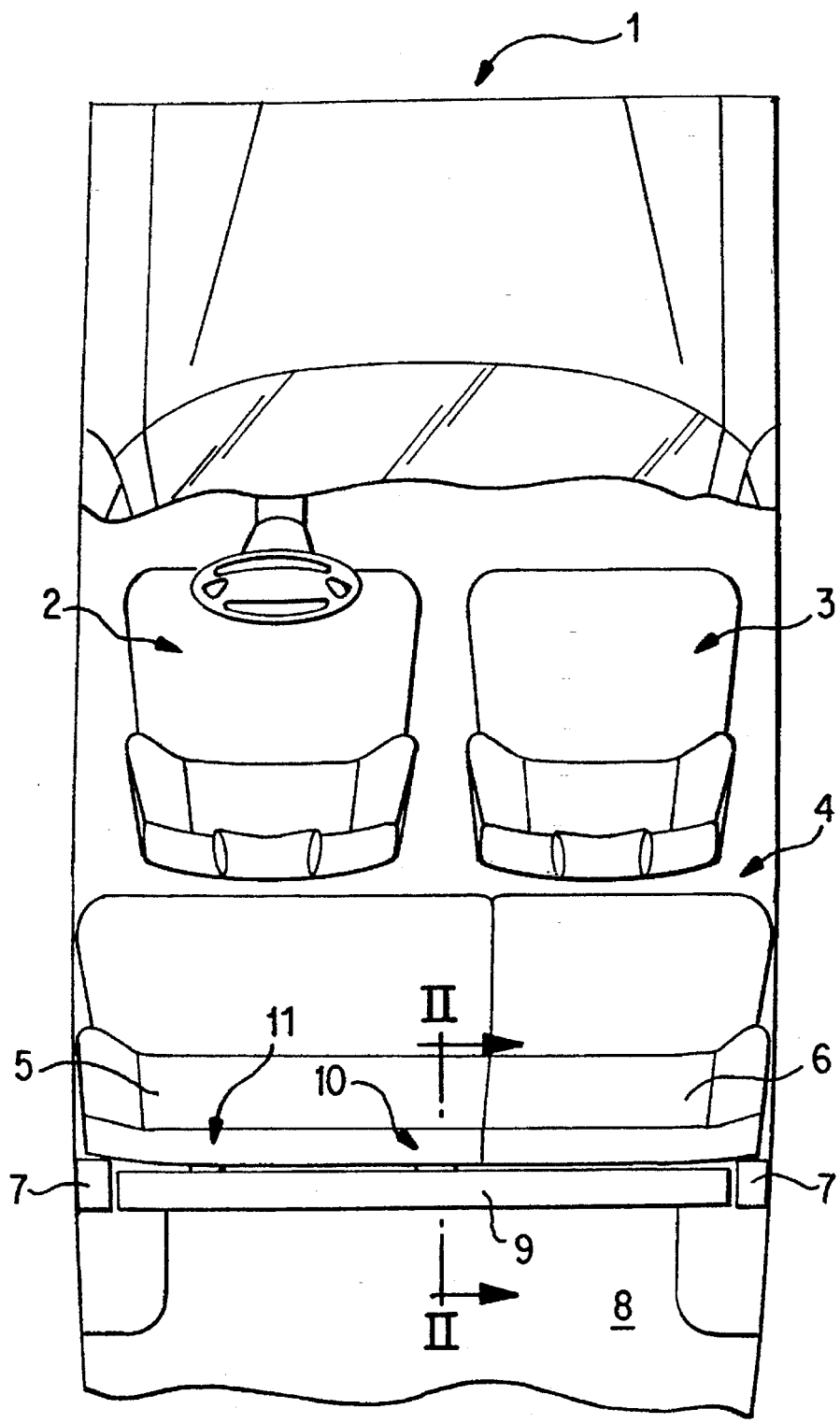
FIG. 1 is a plan schematic view of an interior of an estate car which is provided with one embodiment of a rear seat bench incorporating the present invention.

The estate car 1 shown in FIG. 1 has in its interior, behind a driver's seat 2 and a passenger seat 3, a rear seat bench 4 which is provided with a seat cushion (not shown in any more detail) which is divided in two and with a backrest 5, 6 which is also divided in two. The rear seat bench 4 in the ratio of two thirds to one third—in relation to the width of the vehicle—the two-thirds part of the rear seat bench 4 being provided on the left-hand side in the representation according to FIG. 1. The backrest 5,6, which is divided in two, has a larger backrest part 5 which corresponds to two thirds of the width of the entire backrest 5, 6. Moreover, the backrest 5, 6 has a smaller backrest part 6 which adjoins the larger backrest part 5 and corresponds to one third of the width of the backrest 5, 6.

A boot or trunk 8 adjoins the rear seat bench 4 to the rear, in relation to the direction of travel, to which access can be gained from the rear of the estate car by a conventional tailgate (not shown).

Figure 2:
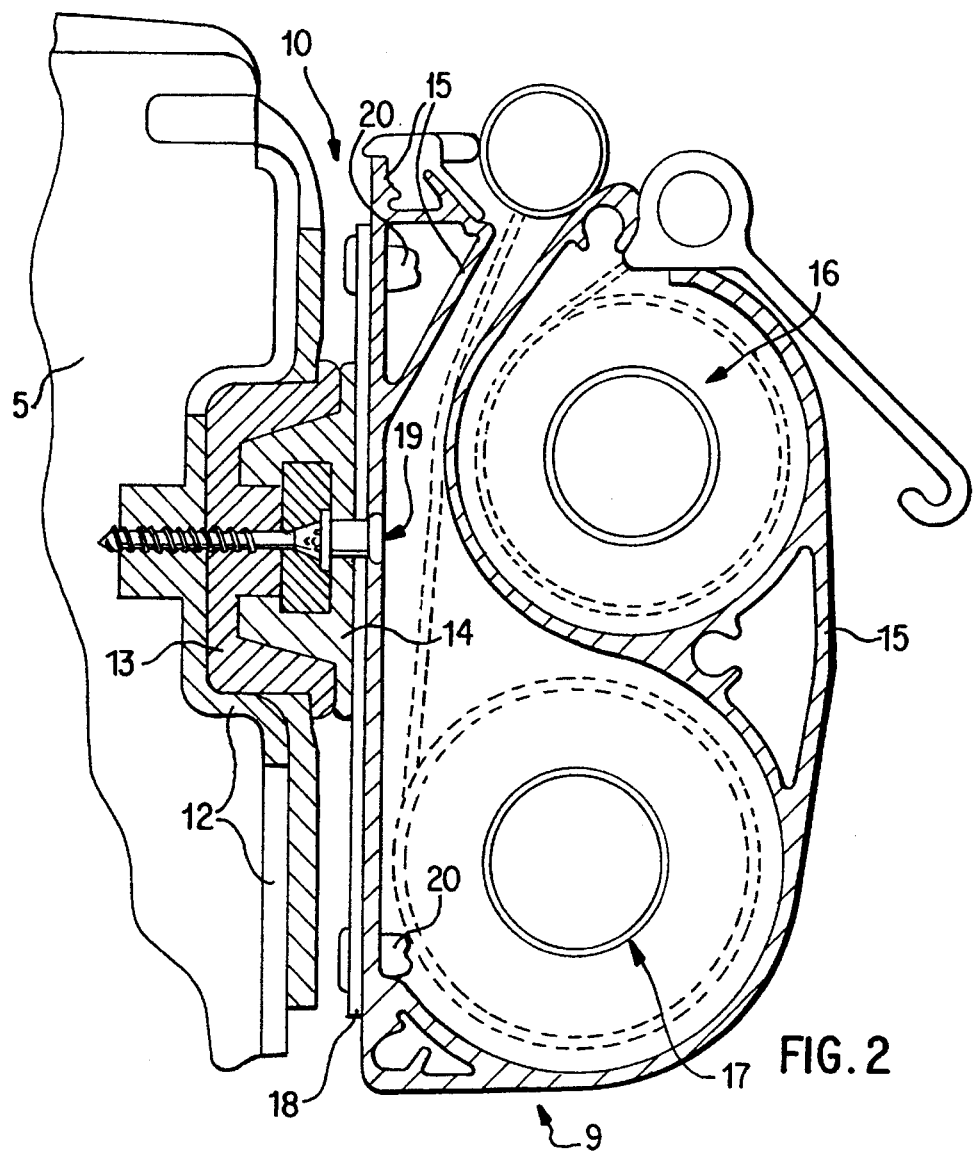
FIG. 2 is an enlarged, partially cross-sectional view through a backrest of the rear seat bench along line II—II in FIG. 1 at the level where a rolling boot shutter is arranged.

On its rear side facing the boot 8, each backrest part 5, 6 has a stable backrest frame 12 as seen in FIG. 2. In order to cover the boot 8 and to secure articles stored in the boot 8, a rolling boot shutter in the form of a double rolling shutter 9 is fitted on the backrest 5, 6 of the rear seat bench 4. The shutter 9 extends essentially over the entire width of the backrest 5, 6.

Both the backrest part 5 and the backrest part 6 can, on the vehicle interior floor, be pivoted, and folded down forwards, about a horizontal spindle extending transversely with respect to the direction of travel. As a result of this pivoting, the boot 8 can be made bigger. Each backrest part 5, 6, is secured by a lock on opposite sides of the bodywork or vehicle frame to secure the backrest parts 5, 6 in an approximately vertically upright position. In the region in which the two backrest parts 5, 6 adjoin one another, the latter are neither connected to one another, nor is there retention with respect to the bodywork since this region only has the boot 8 adjoining it to the rear.

The rolling boot shutter 9 includes a stable housing profile 15 in which two rolling-shutter tarpaulins 16, 17 are arranged such that they are rolled up in parallel one above the other again as seen in FIG. 2. The housing profile 15 is fastened releasably on the frame 12 of the larger backrest part 5 by two spaced closure arrangements 10, 11 arranged in a common horizontal plane. In the illustrated embodiment, the two closure arrangements 10, 11 are known bayonet-type closures.

The double rolling shutter 9 is mounted and dismounted in each case by attachment and lateral displacement in a generally known manner. One of the two closure arrangements 10, 11 is arranged, in the immediate vicinity of the smaller backrest part 6, on the frame 12 of the larger backrest part 5. In this region, in the event of frontal impact, the larger backrest part 5 would be subjected to approximately maximum bending in the direction of travel.

A belt retractor can be integrated in the larger backrest part 5 level with the closure arrangement 10 but towards the front in the direction of travel. The weight of such a belt retractor gives rise to an additional bending moment in the direction of travel in the event of impact loading.

In order to dissipate the energy released by bending in the event of frontal impact, an energy absorber 18 is arranged in the region of the closure arrangement 10 between the housing profile 15 and the frame 12 of the larger backrest part 5. In the illustrated embodiment, in addition, an energy absorber is also provided in the region of the other closure arrangement 11. The arrangement of this energy absorber, however, corresponds to the energy absorber 18, described in detail hereinbelow, corresponding to FIGS. 2 and 3.

The bayonet closure arrangement 10 has two mutually corresponding closure elements 13, 14. One closure element 13 is fastened in a depression of the backrest frame 12; the other closure element 14 is fastened, with the interposition of the energy absorber 18, on the front side (the side facing the backrest part 5) of the housing profile 15.

Figure 3:
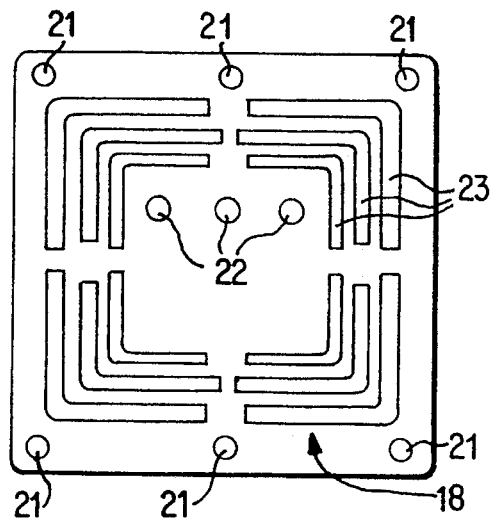
FIG. 3 is an isolated enlarged view of the energy absorber for use in the rear seat bench of FIG. 1 and comprising a single-layer steel plate, between the housing profile and the backrest frame seen in FIG. 2.

The energy absorber 18 shown in FIGS. 2 and 3 is a single-layer, square steel plate having a plurality of angular punched-out portions 23. A total of twelve angular punched-out portions 23 are provided in the steel plate, in each case four punched-out portions 23 making up a rectangle or square. The end sides of mutually adjacent punched-out portions 23 are each spaced apart from one another, so that in each case continuous webs are provided between the punched-out portions 23 along the center longitudinal axes of the steel plate.

The angular punched-out portions 23 of the three rectangles fitted one inside the other have "legs" which are asymmetrically of different lengths, with the result that there is a narrower web between the longer legs of two adjacent punched-out portions 23 than between the shorter legs of the correspondingly adjacent punched-out portions 23.

In the region of two opposite borders (in the region of its upper side and in the region of its underside in FIG. 3), the steel plate has in each case three bores 21 which are arranged in a row for fastening the steel plate, with the aid of rivets 20 as seen in FIG. 2, in corresponding bores of the housing profile 15.

The punched-out portions 23 fitted one inside the other corresponding to three rectangles provide concentrically in the inner region of the steel plate, a smaller plate part in which three bores 22 are arranged one beside the other in a row. The three bores 22 are arranged eccentrically in the plate part, with a common axis running parallel to a steel-plate center longitudinal axis which is horizontal in FIG. 3. The three bores 22 serve for fastening the closure element 14, which is connected to the central plate part of the steel plate, with the aid of three rivets 19.

Because the steel plate is connected, in the region of its outer border, to the housing profile and, in the region of its central plate part, to the closure element 14, the steel-plate surface-area regions which are located therebetween and are provided with the punched-out portions 23 act, in the event of the closure element 14 being subjected to tensile loading, as deformation regions, with energy being dissipated in the process. Depending on the loading, the webs, of different widths, between the punched-out portions 23 rupture. The closure element 14 is subjected to tensile loading as soon as the closure element 14 is pushed in a positively locking manner onto the corresponding closure element 13 of the backrest frame 12 and pronounced impact loading acts in the direction of travel on the estate car, in particular in the event of frontal impact. This results because the backrest part 5 then bends forwards in the direction of travel, whereas the stable housing profile 15 extending over the width of the backrest acts as a flexurally rigid support. The closure element 14 is fastened on the central plate part with the aid of rivets 19, just as the steel plate is attached in the region of the outer bore 21. As is represented in FIG. 2, the rivets 19 are, of course, connected only to the central plate part of the steel plate and not to the housing profile 15.

Figure 4:
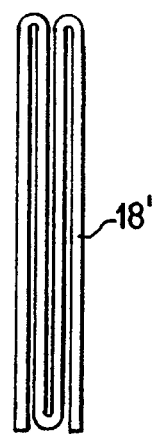
FIG. 4 is a side view of another embodiment of the energy absorber in the form of a folded multi-layer steel plate.

Although the invention has been described and illustrated in detail, it is to be clearly understood that the same is by way of illustration and example, and is not to be taken by way of limitation. For example the energy absorber can be in the form of a folded, multi-layer steel plate 18' as seen in FIG. 4. The spirit and scope of the present invention are to be limited only by the terms of the appended claims.

What is claimed is:

1. A rear seat bench for an estate car, comprising a backrest having two backrest parts of unequal length with each of the backrest parts being configured to fold down separately, and each backrest part having a backrest frame and being secured to an outer side of the car facing rearwardly, and at least two horizontally spaced-apart closure arrangements arranged on the frame of the larger backrest part for releasably fastening a rolling-boot-shutter housing profile arranged to extend over an entire width of the backrest, wherein an energy absorber is arranged in a region of the at least two closure arrangements between the frame of the larger backrest part and the profile.

2. The rear seat bench according to claim 1, wherein the energy absorber is a folded, multi-layer steel plate.

3. The rear seat bench according to claim 1, wherein the energy absorber is a single-layer punched part provided with a plurality of adjoining, single-plane sub-regions.

4. The rear seat bench according to claim 3, wherein the punched part is sheet steel.

5. The rear seat bench according to claim 4, wherein the punched part is fastened on the housing profile, and a closure element of the closure arrangement is operatively retained on the punched part.

* * * * *